US 11,407,633 B2

(12) United States Patent
Kane

(10) Patent No.: US 11,407,633 B2
(45) Date of Patent: *Aug. 9, 2022

(54) SYSTEM AND METHOD FOR FORMING A FOUNDATION TRUSS

(71) Applicant: Atlanta Attachment Company, Lawrenceville, GA (US)

(72) Inventor: Jeffrey S. Kane, Lawrenceville, GA (US)

(73) Assignee: Atlanta Attachment Company, Lawrenceville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/110,810

(22) Filed: Dec. 3, 2020

(65) Prior Publication Data

US 2021/0087051 A1    Mar. 25, 2021

Related U.S. Application Data

(63) Continuation of application No. 16/298,324, filed on Mar. 11, 2019, now Pat. No. 10,858,237.

(Continued)

(51) Int. Cl.
*B68G 15/00* (2006.01)
*B68G 7/12* (2006.01)
(Continued)

(52) U.S. Cl.
CPC .......... *B68G 15/005* (2013.01); *B23P 19/004* (2013.01); *B23P 19/006* (2013.01);
(Continued)

(58) Field of Classification Search
CPC ........ B68G 7/12; B68G 15/005; B23P 19/04; B23P 19/004; B23P 19/005; B23P 19/006;
(Continued)

(56) References Cited

U.S. PATENT DOCUMENTS 2,473,656 A    6/1949  Lyon et al.
2,856,826 A   10/1958  Norquist et al.
(Continued)

FOREIGN PATENT DOCUMENTS

WO    WO1982003995 A1    11/1982
WO    WO1994006597 A1     3/1994
WO    WO1994007036 A1     3/1994

OTHER PUBLICATIONS

Viking—https://www.vikingeng.com/equipment/bedding-automation/sprint-iix—Home/Equipment/Bedding Automation/Sprint IIX—Specifications of the Sprint IIX; This item is not dated, but is believed to have been publically available prior to the filing date of the current application.

(Continued)

*Primary Examiner* — Jermie E Cozart
(74) *Attorney, Agent, or Firm* — Womble Bond Dickinson (US) LLP

(57) ABSTRACT

A system and method for forming a foundation truss for a box spring or mattress foundation frame includes a first truss rail assembly station having a series of block feeders, a top rail hopper and a filler strip hopper that received stacks of truss components such as blocks, top rails and filler strips and feed such truss components into stacked registration. The stacked truss components are moved into engagement with a series of staplers that secure the filler strips, top rails and blocks together to form first truss rail portions, which are then fed to a second truss rail assembly station where a bottom rail is automatically applied thereto.

20 Claims, 15 Drawing Sheets

Related U.S. Application Data

(60) Provisional application No. 62/641,798, filed on Mar. 12, 2018.

(51) Int. Cl.
    *B23P 19/04*     (2006.01)
    *B23P 21/00*     (2006.01)
    *B23P 19/00*     (2006.01)
    *B65D 19/14*     (2006.01)
    *B65D 19/00*     (2006.01)

(52) U.S. Cl.
CPC ............ *B23P 19/008* (2013.01); *B23P 19/04* (2013.01); *B23P 21/00* (2013.01); *B23P 21/004* (2013.01); *B68G 7/12* (2013.01); *B23P 19/005* (2013.01); *B23P 21/008* (2013.01); *B65D 19/00* (2013.01); *B65D 19/14* (2013.01); *Y10T 29/5343* (2015.01); *Y10T 29/53435* (2015.01)

(58) Field of Classification Search
CPC ....... B23P 19/008; B23P 21/00; B23P 21/004; B23P 21/008; B65D 19/00; B65D 19/14; Y10T 29/5343; Y10T 29/53435
See application file for complete search history.

(56) References Cited

U.S. PATENT DOCUMENTS

| | | |
|---|---|---|
| 3,537,168 A | 11/1970 | Ellsworth et al. |
| 3,606,130 A | 9/1971 | De Lamar et al. |
| 3,633,903 A | 1/1972 | Foster, Jr. |
| 3,755,871 A | 9/1973 | Nelson, Jr. |
| 3,945,549 A | 3/1976 | Colson |
| 3,949,458 A | 4/1976 | Saidel |
| 3,968,560 A | 7/1976 | Vial |
| 3,982,313 A | 9/1976 | Nelson, Jr. |
| 4,002,008 A | 1/1977 | Grasson |
| 4,039,112 A | 8/1977 | Schultz |
| 4,392,600 A | 7/1983 | Billett et al. |
| 4,403,388 A | 9/1983 | Belcher |
| 4,489,874 A | 12/1984 | Worst et al. |
| 4,492,016 A | 1/1985 | Smets et al. |
| 4,518,379 A | 5/1985 | Eldridge |
| 4,782,989 A | 11/1988 | Wallin et al. |
| 4,792,325 A | 12/1988 | Schmidtke |
| 4,793,540 A | 12/1988 | Mangan |
| 4,824,004 A | 4/1989 | Hanson |
| 5,052,307 A | 10/1991 | Morrison |
| 5,184,558 A | 2/1993 | Wozniacki |
| 5,249,352 A | 10/1993 | Landers |
| 5,312,022 A | 5/1994 | Thompson et al. |
| 5,335,499 A | 8/1994 | Thompson et al. |
| 5,355,575 A | 10/1994 | Self |
| 5,372,570 A | 12/1994 | Schmidtke et al. |
| 5,379,513 A | 1/1995 | Thompson et al. |
| 5,385,625 A | 1/1995 | LaFreniere |
| 5,547,002 A | 8/1996 | Runnebaum |
| 5,555,617 A | 9/1996 | Pope |
| 5,569,148 A | 10/1996 | LaFreniere et al. |
| 5,701,653 A | 12/1997 | Rupe |
| 5,797,832 A | 8/1998 | Ong et al. |
| 5,943,766 A | 8/1999 | Beane |
| 6,159,137 A | 12/2000 | Lee et al. |
| 6,176,009 B1 | 1/2001 | Inman |
| 6,430,800 B1 | 8/2002 | Buck |
| 6,651,306 B1 | 11/2003 | LePoire |
| 6,736,591 B2 | 5/2004 | Buck |
| 6,758,800 B2 | 7/2004 | Jaen |
| 6,763,567 B2 | 7/2004 | Smith et al. |
| 6,944,928 B1 | 9/2005 | Johansson |
| 7,165,304 B2 | 1/2007 | Smith et al. |
| 7,175,738 B2 | 2/2007 | Lindsay et al. |
| 7,472,474 B2 | 1/2009 | Jaen |
| 10,252,867 B2 | 4/2019 | Whitfield, Sr. et al. |
| 10,858,237 B2 * | 12/2020 | Kane ....................... B23P 21/00 |
| 2002/0104210 A1 | 8/2002 | Buck |
| 2005/0251981 A1 | 11/2005 | Mossbeck |
| 2006/0011696 A1 | 1/2006 | Mossbeck |
| 2006/0174719 A1 | 8/2006 | Carter et al. |
| 2006/0242820 A1 | 11/2006 | Townsend et al. |
| 2007/0006450 A1 | 1/2007 | Jaen |
| 2008/0078026 A1 | 4/2008 | Thomas |
| 2014/0102338 A1 | 4/2014 | Stevens |
| 2015/0360809 A1 | 12/2015 | McBride et al. |

OTHER PUBLICATIONS

Viking—https://www.vikingeng.com/equipment/bedding-automation/viking-skute-bed-machine—Skute—Standard Features; available publically as of Sep. 6, 2015.

Viking—https://www.vikingeng.com/equipment/bedding-automation/viking-sprint-component-fastener—Sprint Component Fastener—Standard Features; available publically as of Sep. 6, 2015.

\* cited by examiner

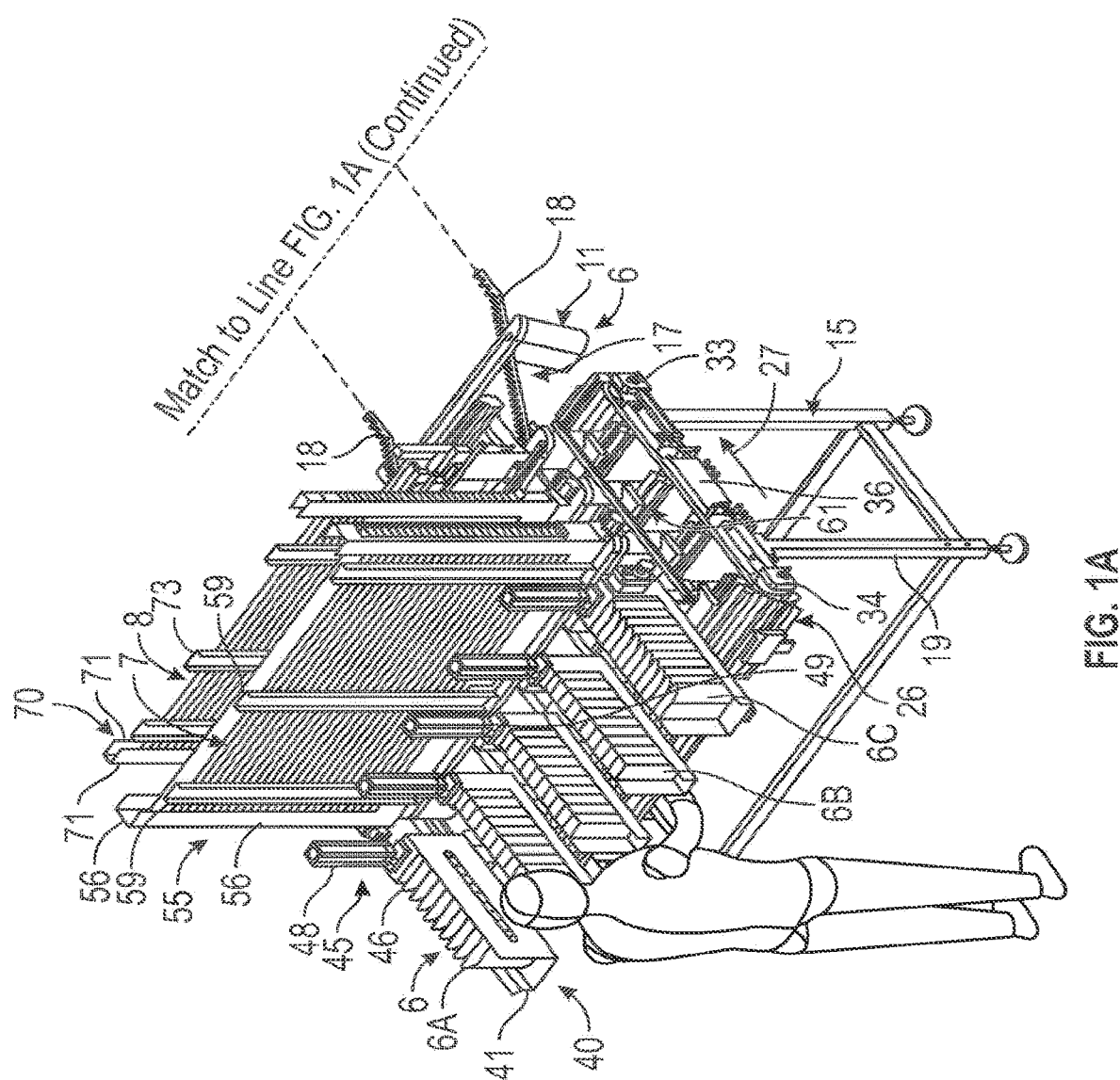

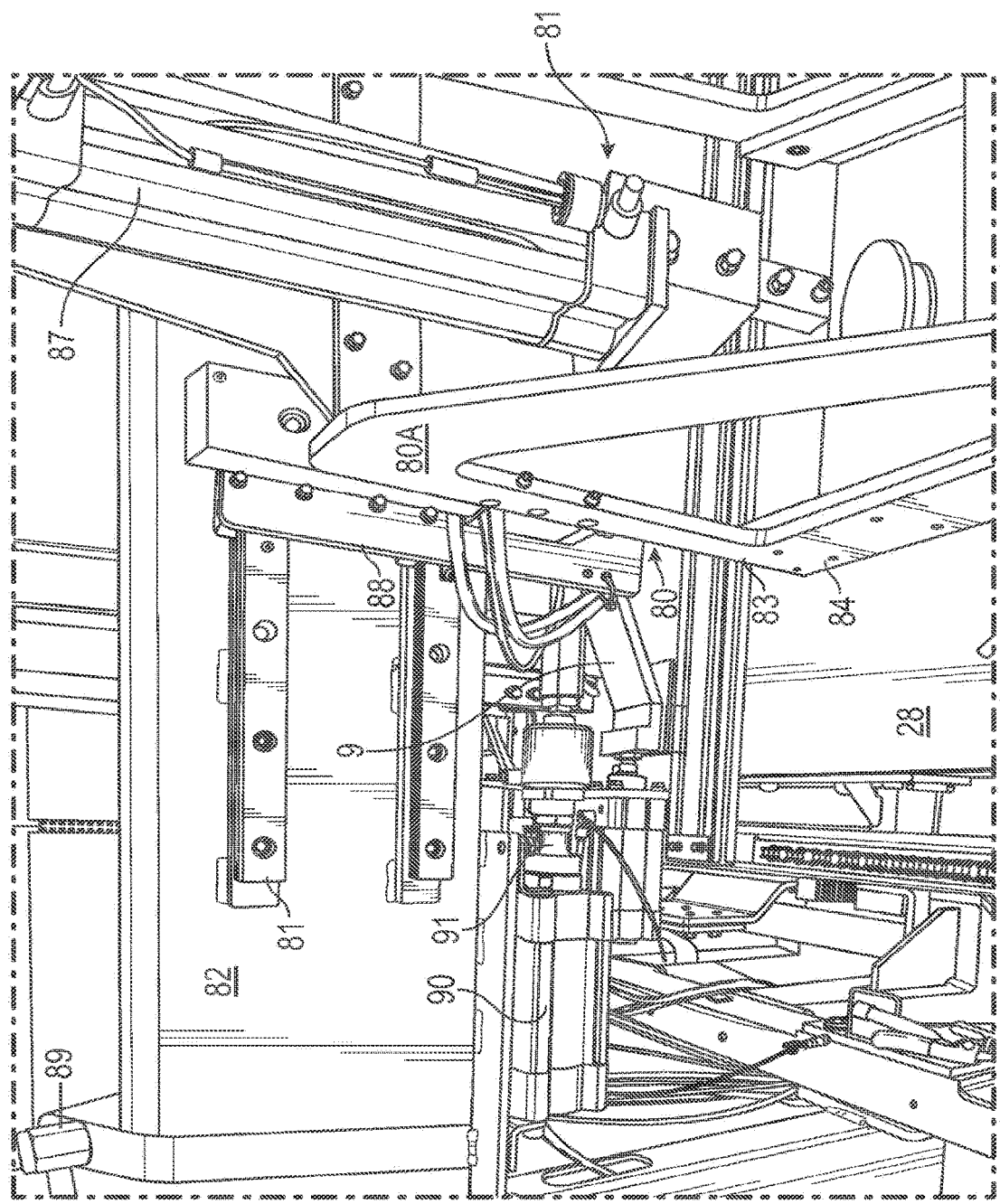

SYSTEM AND METHOD FOR FORMING A FOUNDATION TRUSS

CROSS REFERENCE TO RELATED APPLICATION

The present Patent Application is a continuation of previously filed, co-pending U.S. patent application Ser. No. 16/298,324, filed Mar. 11, 2019, which claims the benefit of U.S. provisional patent application No. 62/641,798 filed on Mar. 12, 2018. The specifications and drawings of U.S. patent application Ser. No. 16/298,324, filed Mar. 11, 2019, and U.S. provisional patent application No. 62/641,798, filed Mar. 12, 2018, are specifically incorporated by reference herein as if set forth in their entireties.

FIELD OF THE INVENTION

The present invention generally relates to systems and methods for the manufacture of bedding components, and in particular to the manufacture of trusses for box springs or foundation frames.

BACKGROUND

The manufacture of box springs and/or foundation sets, such as for supporting mattresses, typically involves formation of a wooden frame within which springs or other resilient support materials are mounted, and over which a fabric covering is applied. Such foundation frames generally include a series of longitudinally extending trusses with laterally extending slats secured across the trusses to form a square or substantially square box frame. Traditionally, manufacture of such foundation frames has been a somewhat manual process, typically requiring workers to align or position the various foundation pieces within a jig and thereafter staple or nail the foundation pieces together. Such manually intensive operations have limited production speeds and while increasing labor costs. Semiautomatic equipment now has been introduced to manufacture components of such foundation frames. However, such equipment still generally requires substantial manual interaction by an operator, such as to manually load one or more components into a machine, and to ensure that the blocks and rail pieces are properly aligned before initiating fastening operation.

Accordingly, it can be seen that a need exists for a system and method of manufacturing box spring or foundation frame components that addresses the foregoing and other related and unrelated problems in the art.

SUMMARY

Briefly described, the present disclosure generally relates to a system and method for substantially automatically forming frame components for box springs or foundation sets such as for supporting mattresses. In one aspect, the system and method of the present disclosure is directed to the substantially automated formation of trusses for use in foundation or box spring frames. Typically, such box springs or foundation frames will include a series of wooden components or pieces (although other materials also can be used), such as a series of blocks interposed between top and bottom rails, and/or with a filler rail (if needed) applied over the top rail. Such frames are hereinafter referred to as foundation frames.

The system of the present disclosure includes a first truss rail assembly station and a second truss rail assembly station, which can be located in an inline or cooperative arrangement and can be linked by a conveyor, such as a removable gravity conveyor, so that after a first truss portion (e.g., a series of inner and outer blocks and a filler rail (if needed) have been secured to a top rail) is formed in the first truss rail assembly station, it can be transferred to the second truss rail assembly station for application of a bottom rail to thus form a completed truss component of a foundation frame. The completed trusses thereafter can be stacked for transfer to inventory or to later or downstream equipment for attachment of lateral slat components thereto to form a completed foundation frame.

The first truss rail assembly station generally will include an assembly conveyor that can be vertically adjustable to accommodate formation of different height or size trusses, and will have a bed with a series of pusher rails attached to drive chains or belts. A series of block feeders are arranged across an input or first end of the first truss rail assembly station, and each includes a hopper in which a series of blocks are stacked, a spring-loaded pusher for urging the blocks toward a discharge, and a loader including a loading actuator such as a cylinder that moves and/or loads the blocks onto the assembly conveyor where the blocks are engaged by the pusher rails.

A top or final rail hopper is located downstream from the block feeders, and includes one or more hopper sections that receive and feed a series of top rails by gravity onto the blocks passing therebelow. Pusher blocks connected to actuators, such as pneumatic or hydraulic cylinders, or other actuators, generally are provided adjacent the outermost sections of the top rail hopper and can be selectively engaged in timed sequence. For example, the pusher blocks generally will be actuated one at a time, with a first pusher block pushing one end of a top rail laterally to release it from the hopper, and as that end of the top rail has been released, the opposite pusher block can be actuated to push the other end of the top rail forwardly to enable it to drop out of the hopper. The top rail, when released from the top rail hopper, generally is received on a guide plate or rail that guides the top rail into registration with the blocks moving therebelow.

A filler strip hopper further can be provided downstream from the top rail hopper, and can have a similar construction to the top rail hopper, including a series of guide or hopper sections that receive a stack of filler strips therein and feed the filler strips by gravity toward engagement with the top rails applied to the blocks as the rails and blocks continue moving along the assembly conveyor. Pusher blocks also can be provided at lower ends of each of the outermost filler strip hopper sections; each of the pusher blocks being connected to an actuator so as to selectively engage and push the ends of the filler strip out of the hopper sections to release the filler strip therefrom. The filler strip further can be released onto a series of sloped or slanted guide rails, which guide the filler strip into registration/engagement with a top surface of the top rail.

Thereafter, the assembled upper or first truss portion, including the filler rail, top rail and a series of blocks arranged in stacked series, are presented to a series of staplers, nailers or other automatic fastening systems. The staplers generally are releasably mounted within support brackets to enable change out and/or reloading of staples or other fasteners, and the support brackets are laterally slidable along rails for adjustment of stapling positions as needed. A primary drive actuator, such as a pneumatic or hydraulic cylinder, solenoid or other actuator, can be mounted at one end of the frame and can be coupled to the support brackets by a drive rod such that the primary drive actuator can control lateral movement of the rail staplers with respect to the truss portion to apply fasteners at multiple positions for attaching the filler and top rails to the blocks. The endmost rail staplers, arranged along the periphery of the frame, additionally can have secondary drive actuators or cylinders to control additional movement of such peripheral end staplers as needed to place additional fasteners in the end blocks of the truss portion.

Once the top and filler rails have been secured to the blocks so as to form the top, upper or first truss portion, the completed first truss portion can be fed to the second truss rail assembly station. The first truss rail portions generally will be received at the second truss rail assembly station within a rail clamping assembly located at a first, upstream or input end of the second truss rail assembly station. The rail clamping assembly can include a series of receiving plates mounted in spaced series along a rotating spindle and having a series of recessed openings in which the top and filler rails of each first truss rail portion are received. The plates further include clamping assemblies that can be selectively actuated, such as upon movement of a cam follower along a cam track, which causes a switch to close or otherwise signal actuation of clamps that engage and hold the top and filler rail as the plate thereafter is rotated approximately 180° so as to present the bottom of the blocks in an upwardly facing attitude for application of a bottom rail thereto.

The second truss rail assembly station further includes a bottom or second rail hopper having a series of guides or hopper sections that receive a stack of second or bottom rails and feed the bottom rails by gravity onto a carriage. The bottom rail hopper also generally can include pusher blocks at the peripheral or outermost hopper sections thereof, and which cooperatively push the ends of the bottom rail out of the hopper sections to release each bottom rail onto a bottom rail inserter portion of the carriage. The carriage is moveable both horizontally toward a position so as to locate the bottom rail over the upstanding blocks, and further is vertically moveable or adjustable so as to move out of engagement with the bottom rail once the bottom rail has been secured to the truss blocks. After the bottom rail has been located on top of the upstanding truss blocks by the bottom rail insertion of the carriage, a series of staplers, nail guns or other fastening mechanisms engage and fasten the bottom rail to the blocks. The staplers generally can be releasably received within brackets mounted along rails so as to be moveable laterally with respect to the truss upon operation of a primary actuator or drive cylinder. Secondary actuators or drive cylinders also can be mounted on the brackets to control movement of the staplers laterally with respect to the truss for applying the staples or fasteners at additional locations along the bottom rail.

Once the bottom rail has been attached to the truss blocks and the carriage has been retracted to a position to receive a next bottom rail, the receiving plates further rotate the now completed truss approximately 90°. The clamps then can be released to allow the completed truss to be deposited onto a discharge conveyor for discharge of the completed truss.

Various objects, features and advantages of the present disclosure will become apparent to those skilled in the art upon a review of the following detailed description, when taken in conjunction with the accompanying drawings.

BRIEF DESCRIPTION OF THE DRAWINGS

FIGS. 4C-4D are end views of the first assembly station, illustrating the formation and fastening of a first truss section.

Figure 1A:
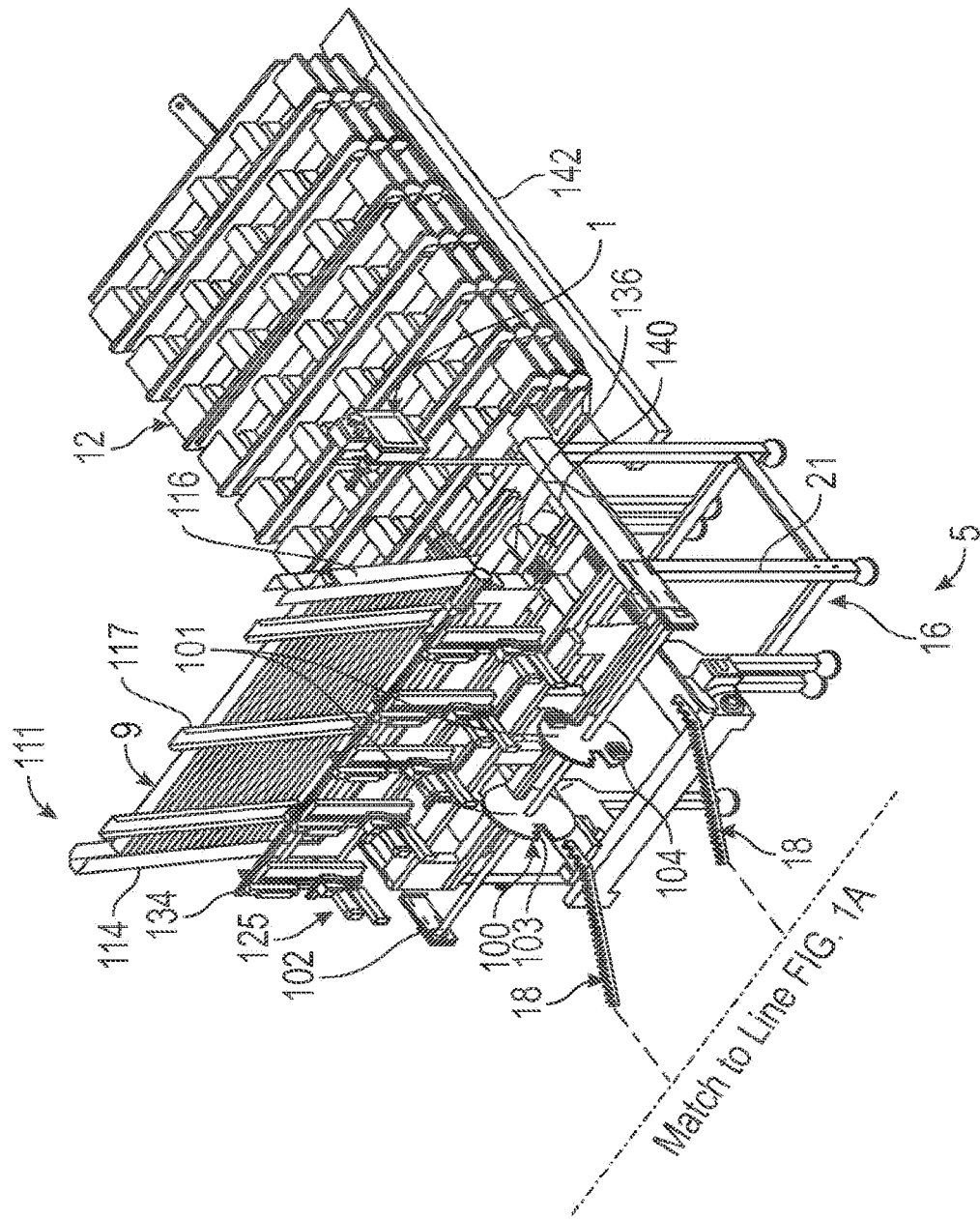
FIGS. 1A-1B are perspective views illustrating the system and method of automatically forming trusses for foundation frames according to the principles of the present invention.

The embodiments of the invention and the various features thereof are explained below in detail with reference to non-limiting embodiments and examples that are described and/or illustrated in the accompanying drawings. It should be noted that various features illustrated in the drawings are not necessarily drawn to scale, and that features of one embodiment may be employed with other embodiments as the skilled artisan would recognize, even if not explicitly stated herein. Those skilled in the art will thus appreciate and understand that, according to common practice; the dimensions of various features and elements of the drawings may be expanded or reduced to more clearly illustrate the embodiments of the present disclosure described herein. In addition, descriptions of certain components and processing techniques may be omitted so as to not unnecessarily obscure the embodiments and/or features of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

DETAILED DESCRIPTION

Referring now to the drawings in which like numerals indicate like parts throughout the several views, FIGS. 1A-4G illustrate the system 5 for automatically forming trusses T for foundation frames for box springs or foundation sets for supporting mattresses and other bedding components and various features and/or operative assemblies of the system. The trusses typically can be formed from wood or other, similar materials and generally will include a series of pieces or components that will be fastened together to form the completed trusses. The truss components generally can include a series of blocks 6 including inner and outer blocks 6A and 6B, over which a first or top rail 7 generally is attached, followed by a filler strip 8, if needed, and a second or bottom rail 9, which is attached along the lower edges of the blocks to form the completed trusses 12 as indicated in FIGS. 1A-1B. As also indicated in FIGS. 1A and 1B, the inner and outer blocks can have different configurations, with the outer blocks generally being wider than the inner blocks, and can have radiused edges 6C. The inner and outer blocks also can be formed in different heights, e.g., approximately 2" up to approximately 7" (although greater or lesser heights also can be provided) as needed for different size foundation frames.

Figure 1B:
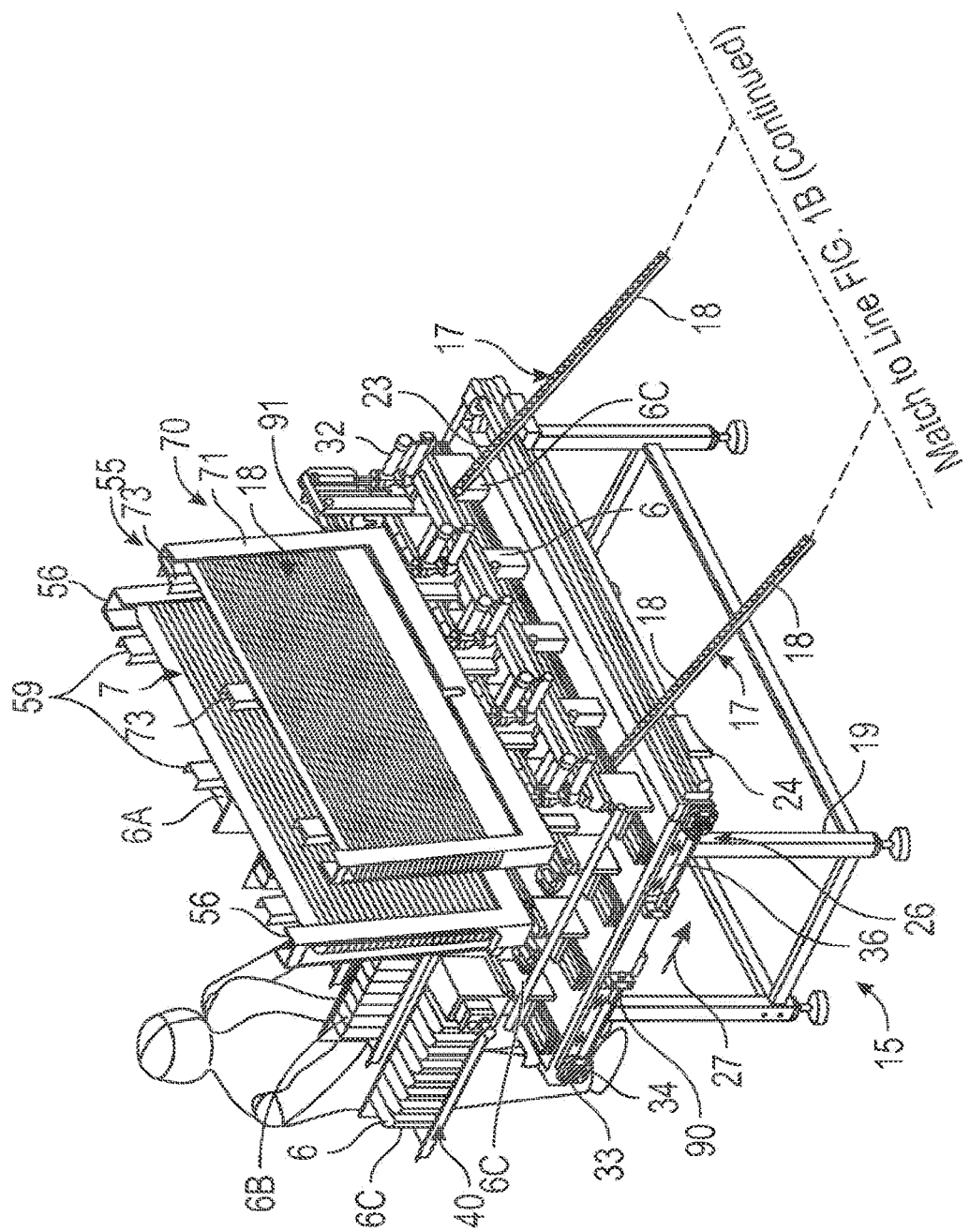
Figure 1B:
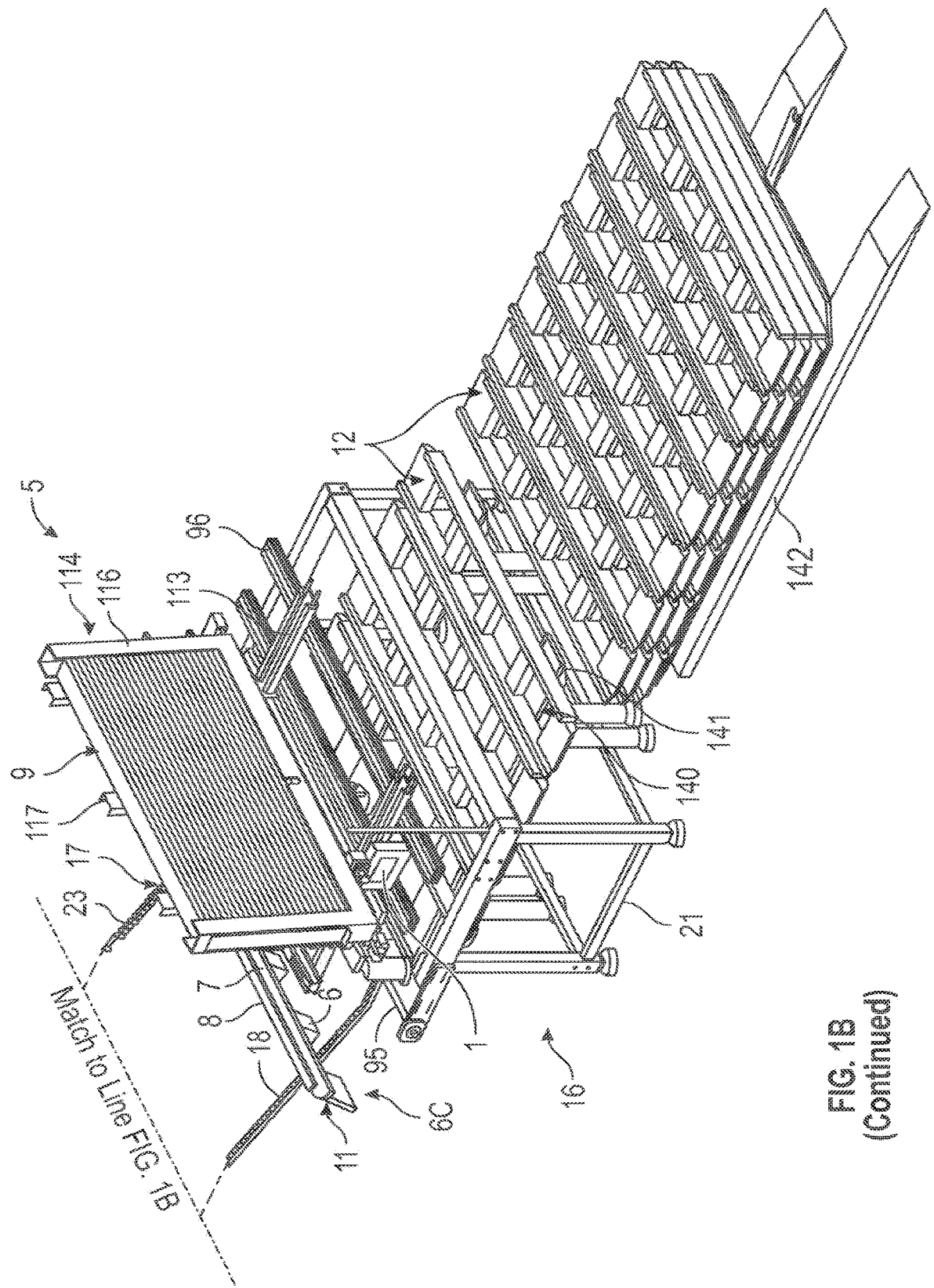
Figure 2:
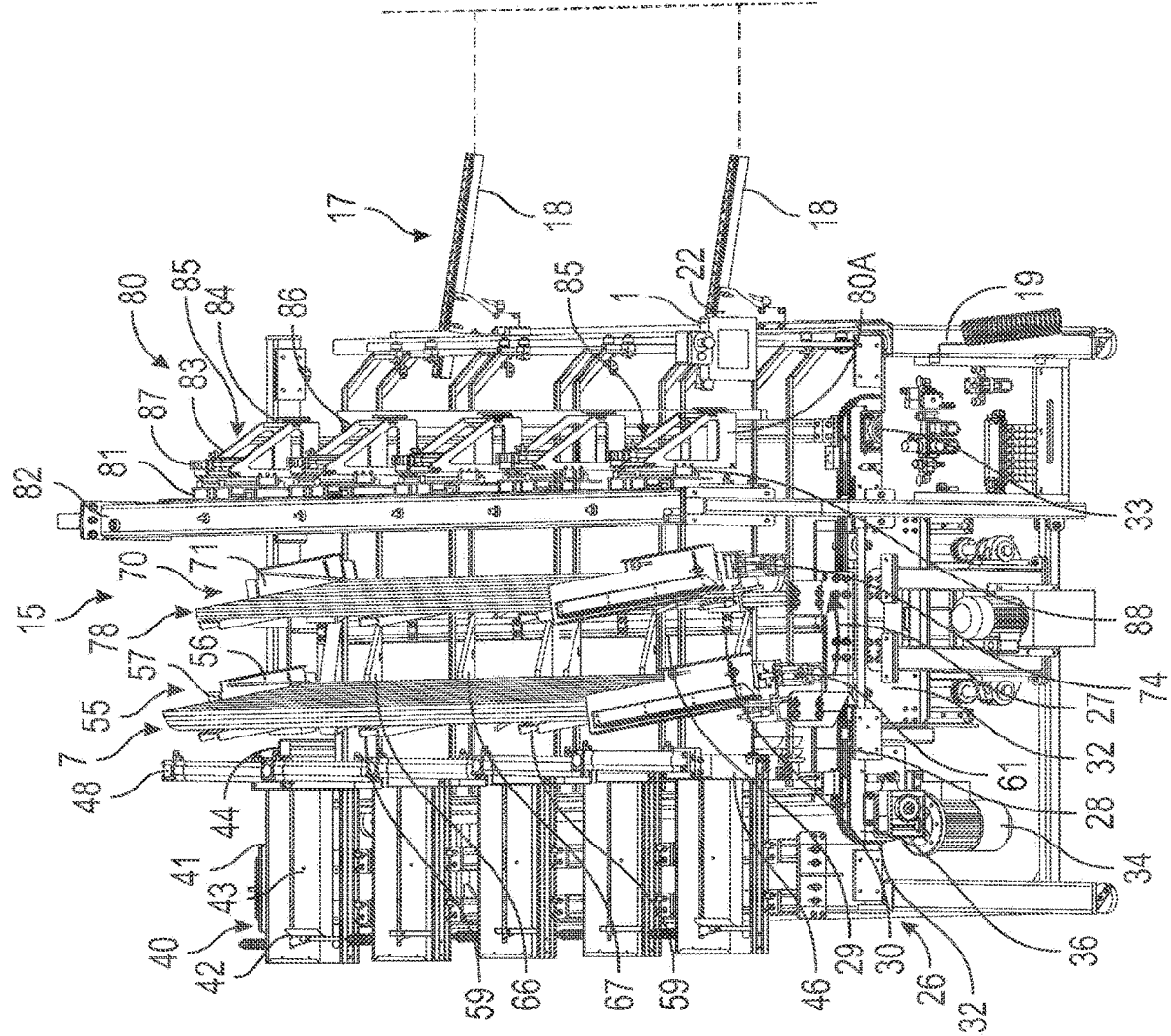
FIG. 2 is a side perspective view of first and second truss assembly stations of the system for forming trusses according to the principles of the present invention.
Figure 2:
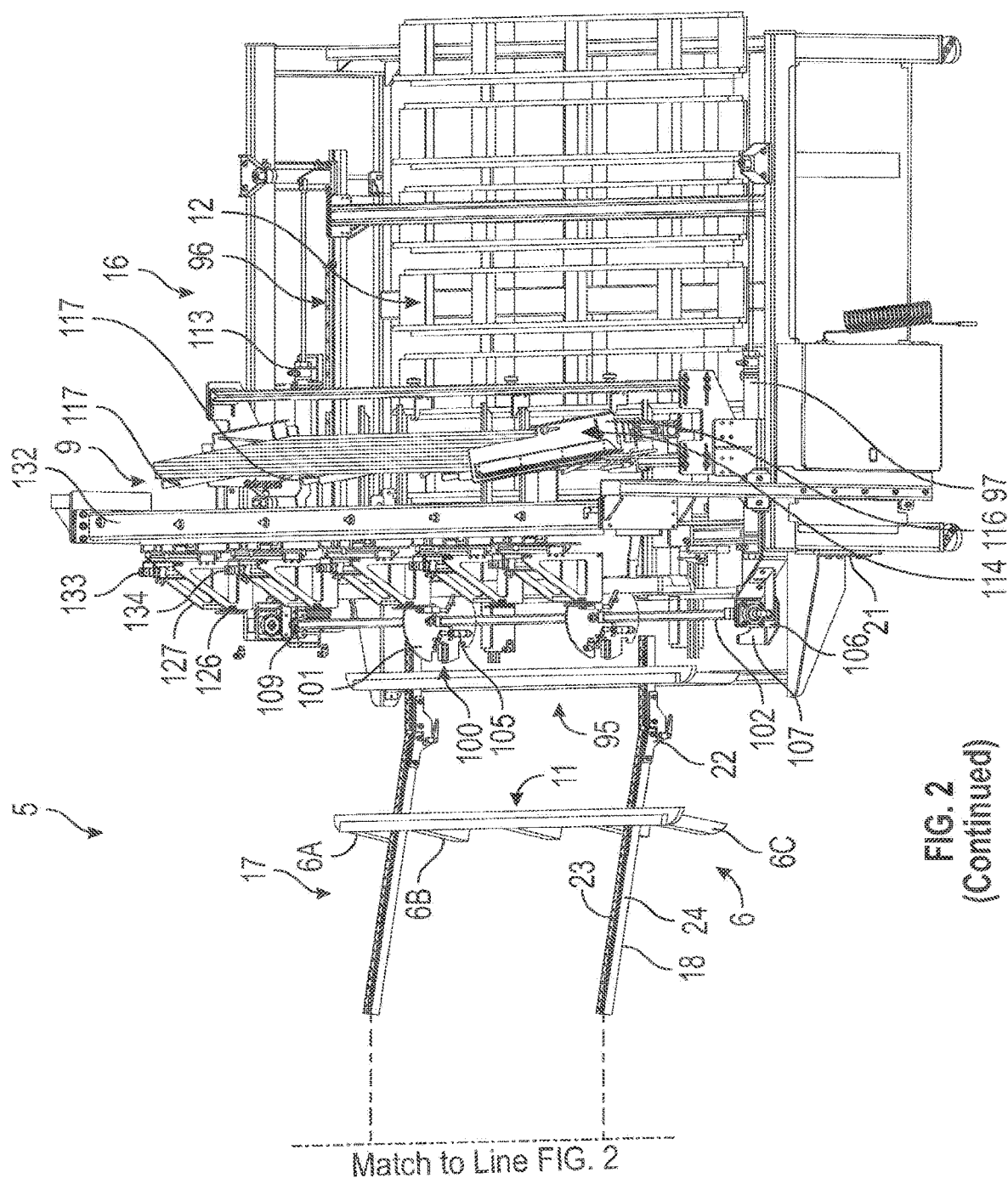

As generally indicated in FIGS. 1A-2, the system 5 for automatically forming trusses 12 for foundation frames generally will include a first or upstream truss rail assembly station 15 and a second, downstream truss rail assembly station 16. The truss rail assembly stations 15 and 16 can be arranged or oriented in a substantially inline arrangement and can be linked or coupled together with one or more transfer mechanisms 17.

As indicated in FIGS. 1A and 2, in one aspect, the transfer mechanism 17 can include gravity conveyor(s) 18 extending between the 2 stations and generally oriented at a downwardly sloping angle between the first and second truss assembly stations so as to allow first, top or upper truss portion 11, once the filler and top rails have been secured to the blocks thereof in the first truss assembly station to be substantially automatically transferred to the second truss assembly station for attachment of the bottom rails 9 thereto to form the completed trusses 12. The gravity feed conveyor ((s) can be removably mountable to the frames 19/21 of the first and second truss assembly stations 15 and 16, respectively, by clamp brackets 22, and typically each will have elongated body 23 with a series of rollers 24 mounted therealong. The angle of the gravity feed conveyors also generally can be adjusted as needed, as can the length of the gravity feed conveyors to further control the transfer and queueing of the first truss portions therealong.

Figure 3A:
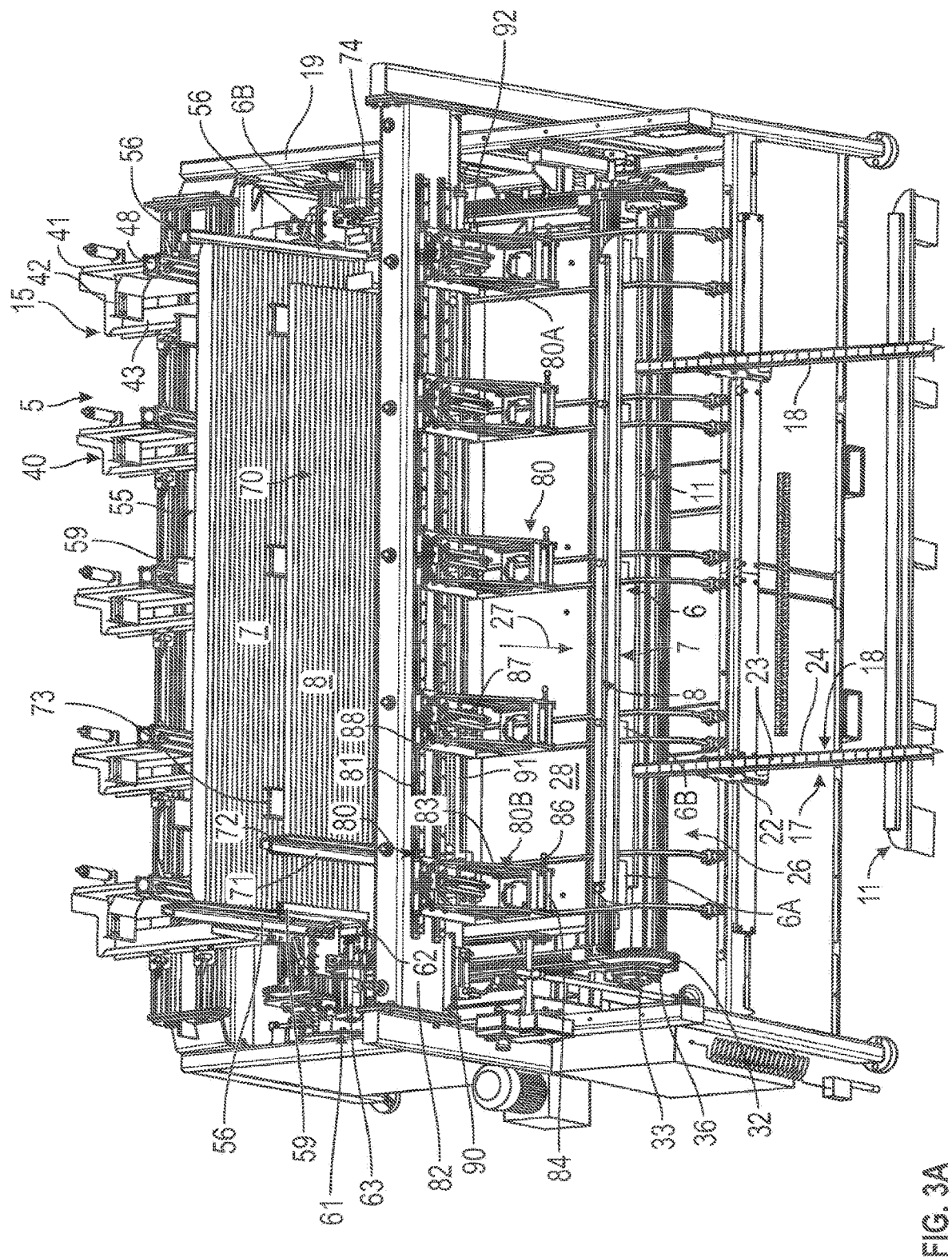
FIGS. 3A-3B are perspective views of the first and second truss assembly stations according to the principles of the present invention.

As further illustrated in FIGS. 1A, 2 and 3A, the first truss rail assembly station 15 generally includes an assembly conveyor 26 that extends and moves along a substantially elliptical path of travel, indicated by arrows 27 across the frame 19 of the first truss rail assembly station. The assembly conveyor 26 generally includes a conveyor bed or body 28 with a series of pusher rails 29 mounted therealong, and which engage and guide sets of blocks and a top rail and filler strip into stacked registration with one another for presentation to a series of staplers, nail guns or other fastener devices or applicators 31 arranged at a downstream end of the first truss rail assembly station. The assembly conveyor bed 28 is attached to drive chains or belts 32 along the peripheral edges or ends thereof, which chains are engaged and driven by sprockets 33, at least one of which is driven by a motor 34. The assembly conveyor 26 further can be adjusted vertically as needed to accommodate different height blocks. For example, the assembly conveyor can be supported by side plates 36 that are attached to a rack or similar lifting mechanism that can be controlled by a cylinder or other actuator to raise and/or lower the assembly conveyor.

A series of block feeders 40 generally are located in spaced series across the input or first end of the frame 19 of the first truss rail assembly station 15, as indicated in FIGS. 1A and 2. While five block feeders are shown, fewer or more block feeders also can be used. Each of the block feeders generally will include a body or hopper 41 configured to receive a stack of blocks 6 as indicated in FIG. 1A. Spring biased pushers 42 engage and urge the stacks of blocks received within chambers 43 defined along the bodies of the block feeders toward a discharge end 44.

Figure 4A:
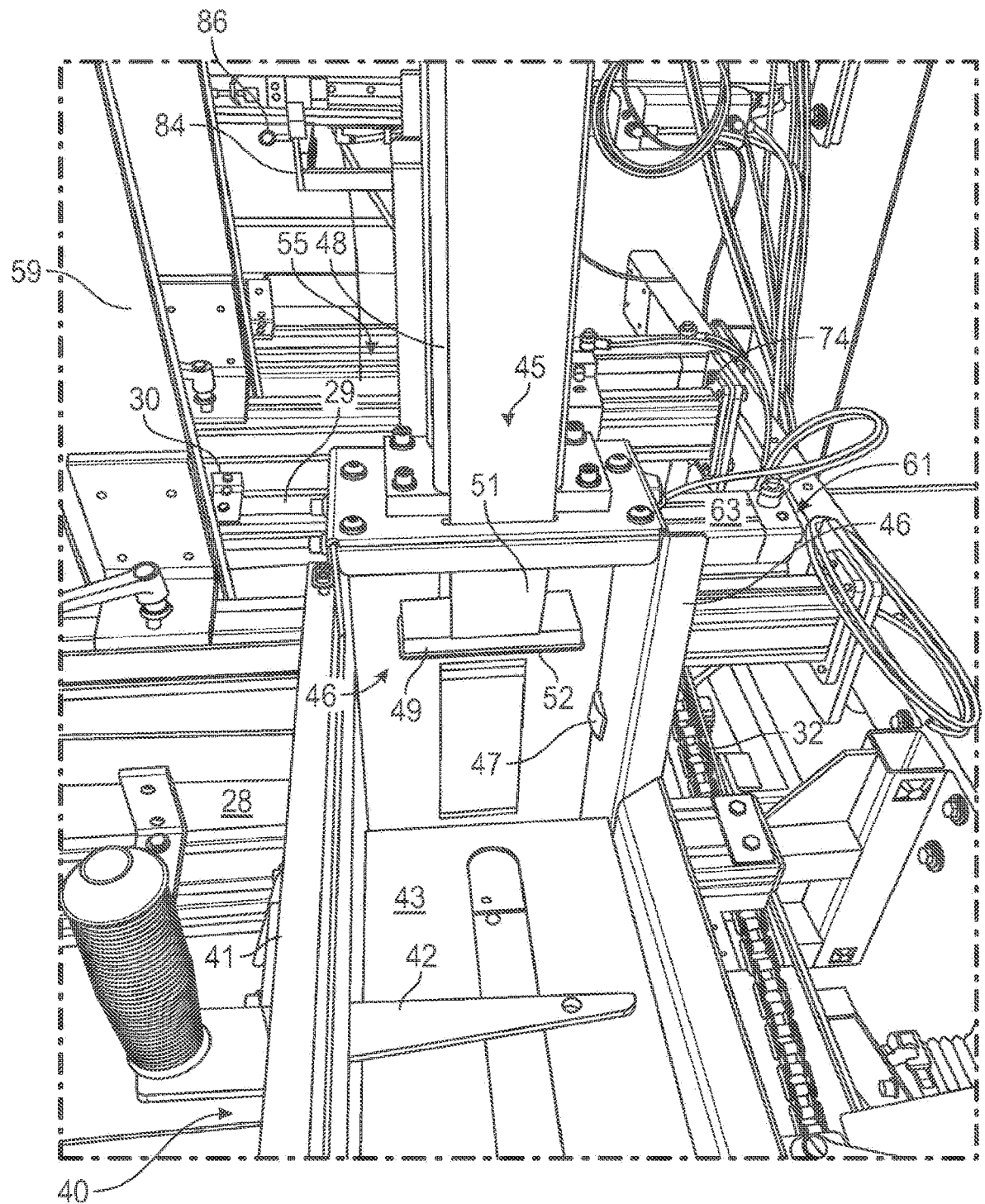
FIG. 4A is a perspective view of a block feeder of the first assembly station.
Figure 4B:
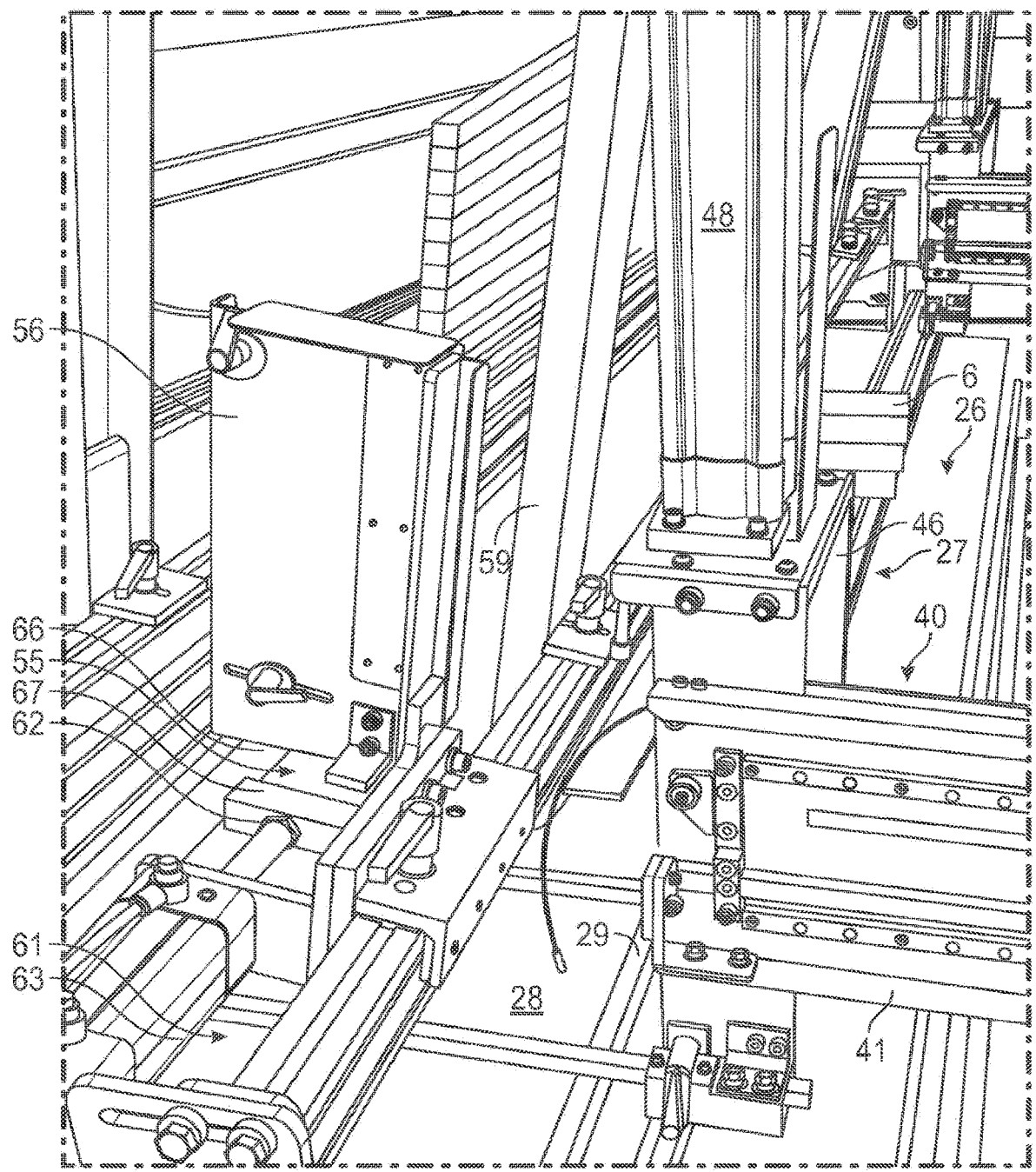
FIG. 4B is a perspective view illustrating the assembly conveyor, block loader and top rail hopper of the first assembly station.

At the discharge end 44 of each block feeder 40, as indicated in FIGS. 4A-4B, a discharge chute 46 is located, which discharge chute 46 receives and guides the blocks downwardly and onto the bed 28 of the assembly conveyor 26. Escapement tabs 47 or other projections are arranged along the discharge chute 46, typically being biased inwardly so as to engage and hold the blocks to prevent inadvertent discharge or falling of blocks through the discharge chute. A loader 45, including a loading actuator 48, such as a pneumatic or hydraulic cylinder, solenoid, motor or other, similar actuator generally is mounted along the discharge chute 46 of each block feeder, and upon actuation, moves a loading plate 49 downwardly, against a block engaged by the tabs 47, and moves the block into a loaded position on the bed of the assembly conveyor. A guard or blocking plate 51 further can be coupled to and moved with the loading plate 49, the blocking plate being moved across the discharge opening 44 so as to prevent a next block of the stack of blocks from incrementing further forwardly during a loading operation.

In addition, the loading plate further can comprise an adhesive applicator 52 such as a plenum or include a series of openings or otherwise be configured to apply an adhesive material along the upper edges of each of the blocks during loading. Such an adhesive material can be applied to help prevent squeaking of the later formed foundation frame. A gasket or other sealing material also can be applied to the bottom surface of the loading plate so as to help prevent excess adhesive from leaking or being spread past the upper edges of the blocks.

Once a set of blocks has been loaded onto the assembly conveyor, as indicated in FIGS. 1A-1B, the blocks will be moved forward with the continued movement of the assembly conveyor along its path of travel 27, with the blocks generally being moved and guided forwardly by pusher rails 29. A first or top rail hopper 55 is mounted downstream from the block feeders and receives a stack of first or top rails 7 therein for feeding onto the top surfaces of the blocks as the blocks are moved along the assembly conveyor.

As generally illustrated in FIGS. 2 and 3A, the top rail hopper generally includes a pair of end or peripheral hopper sections 56 each of which can define a substantially C- or U-shaped cavity 57, and can have guide rails 58 that slope inwardly to help guide the top rails toward a centered position at the lower ends of the top rail hopper, as indicated in FIGS. 1A and 2. Intermediate hopper sections or supports 59 also can be arranged at spaced locations across the frame of the first truss assembly station, as indicated in FIGS. 2 and 3A, to support the span of the top rails thereacross as the top rails are fed from the top rail hopper.

Each of the peripheral top rail hopper sections 56 further includes a top rail pusher assembly 61 adjacent a lower end thereof, as generally illustrated in FIG. 2. Each of the top rail pusher assemblies can include a pusher plate 62 moveable laterally across the lower end of each top rail hopper section upon engagement of an actuator 63, such as pneumatic or hydraulic cylinder, or other actuator. The top rail pusher assemblies are engaged or actuated in a staggered, cooperative operation whereby the pusher plate of a first one of the top rail hopper end sections is initially engaged so as to push a first end of the top rail out of its top rail hopper section, allowing the end of the top rail to be released. Then, as the first pusher plate is being retracted, the pusher plate for the opposite top rail hopper end section is engaged and pushes its corresponding end of the top rail laterally and out of the top rail hopper section to release the top rail from the top rail hopper.

As indicated in FIGS. 2 and 4B, each top rail generally is released onto an angled guide plate 66 having an upper surface 67 that gradually tapers or slopes downwardly. As the blocks continue to move forwardly, pusher plates 30 of the pusher rails 29 engage and urge the top rails along the sloped surfaces of the guide plates and into registration with the upper surfaces of the blocks.

A filler strip hopper 70 (FIGS. 1A-3A) also can be provided downstream from the top rail hopper 55, and will receive a stack of intermediate or filler strips 8 therein. The filler strip hopper can have a similar construction to the top rail hopper, including peripheral or end hopper sections 71 each defining a generally C- or U-shaped cavity in which the ends of the filler rails or strips are received, and guide plates or rails 73 that help guide the filler strips or rails toward a centered position at the bottom or lower ends of the filler strip hopper. Intermediate supports also can be provided to support the span of the filler strips during feeding.

Figure 4C:
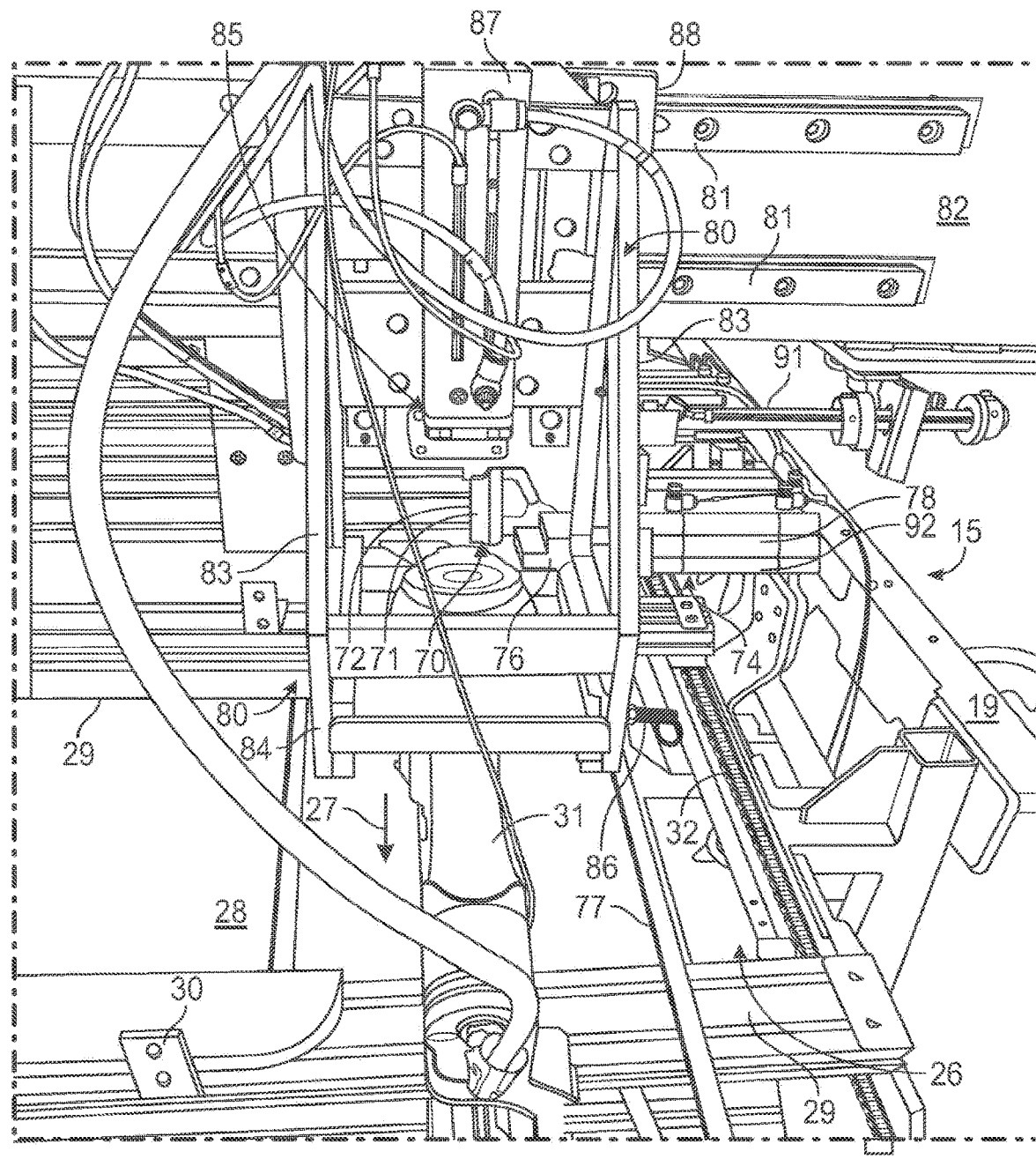
Figure 4E:
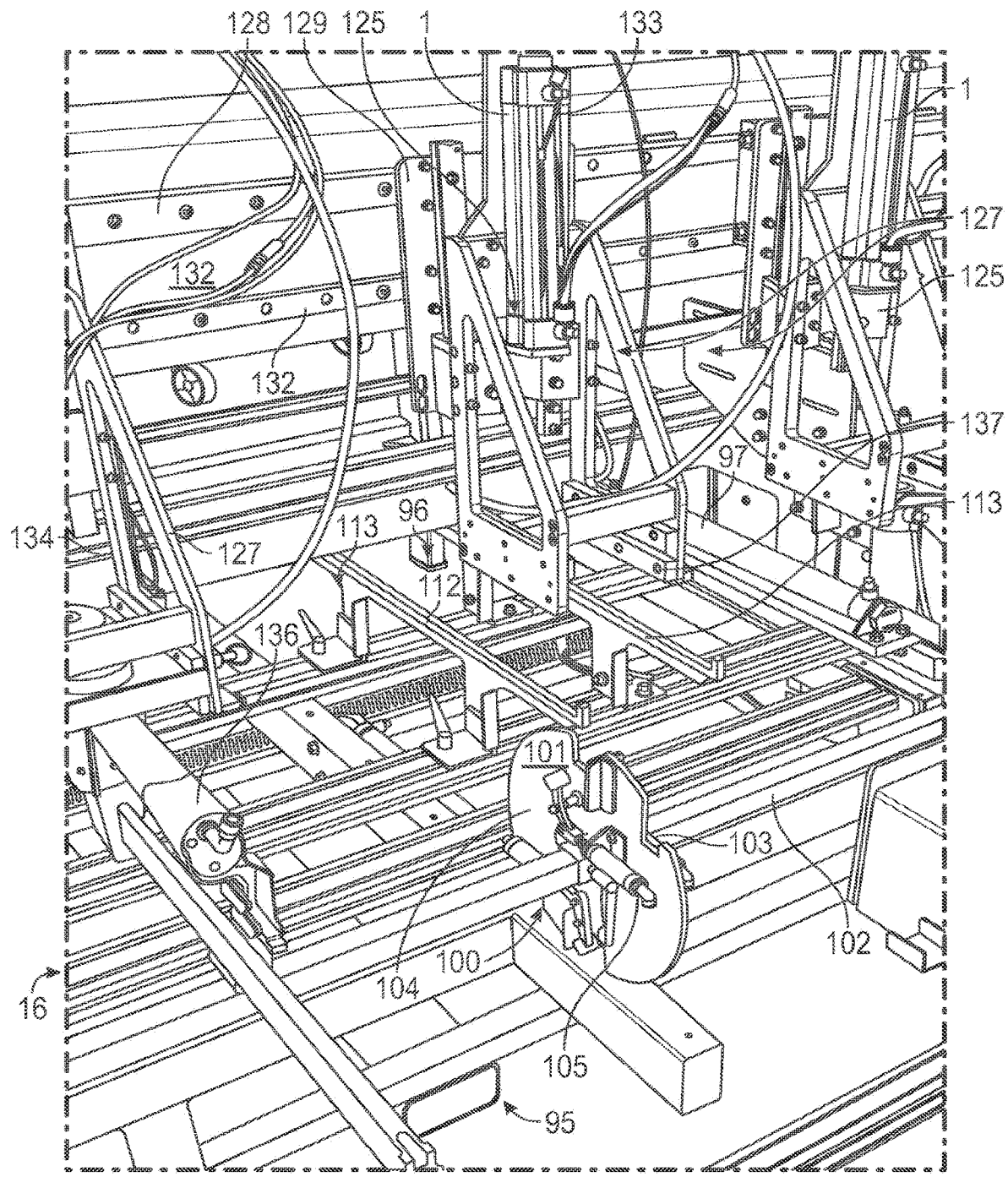
FIG. 4E is a perspective view of the input end of the second truss assembly station.
Figure 4F:
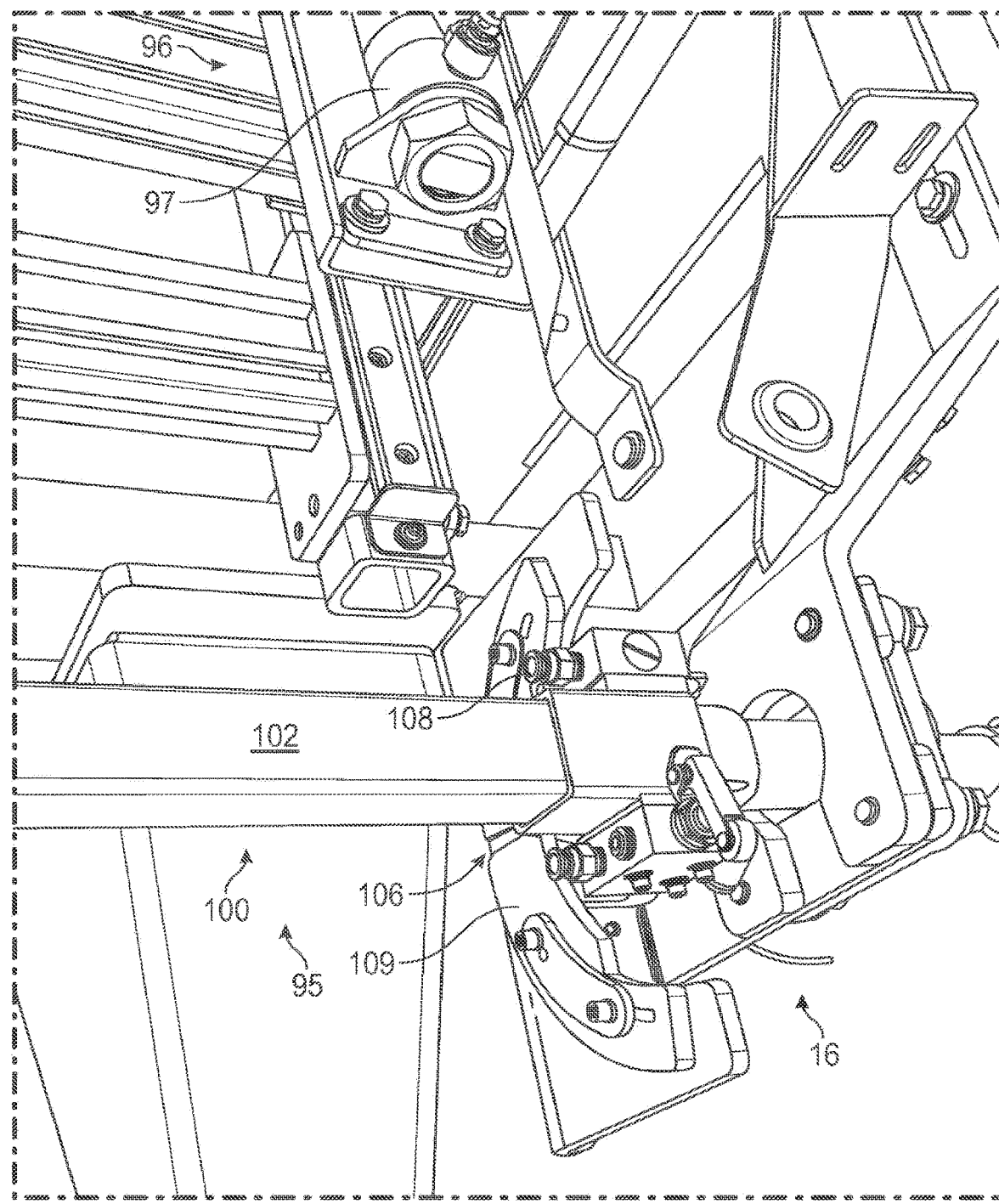
FIG. 4F is a perspective view of the spindle and cam assembly for the clamp assembly of the second truss assembly station.
Figure 4G:
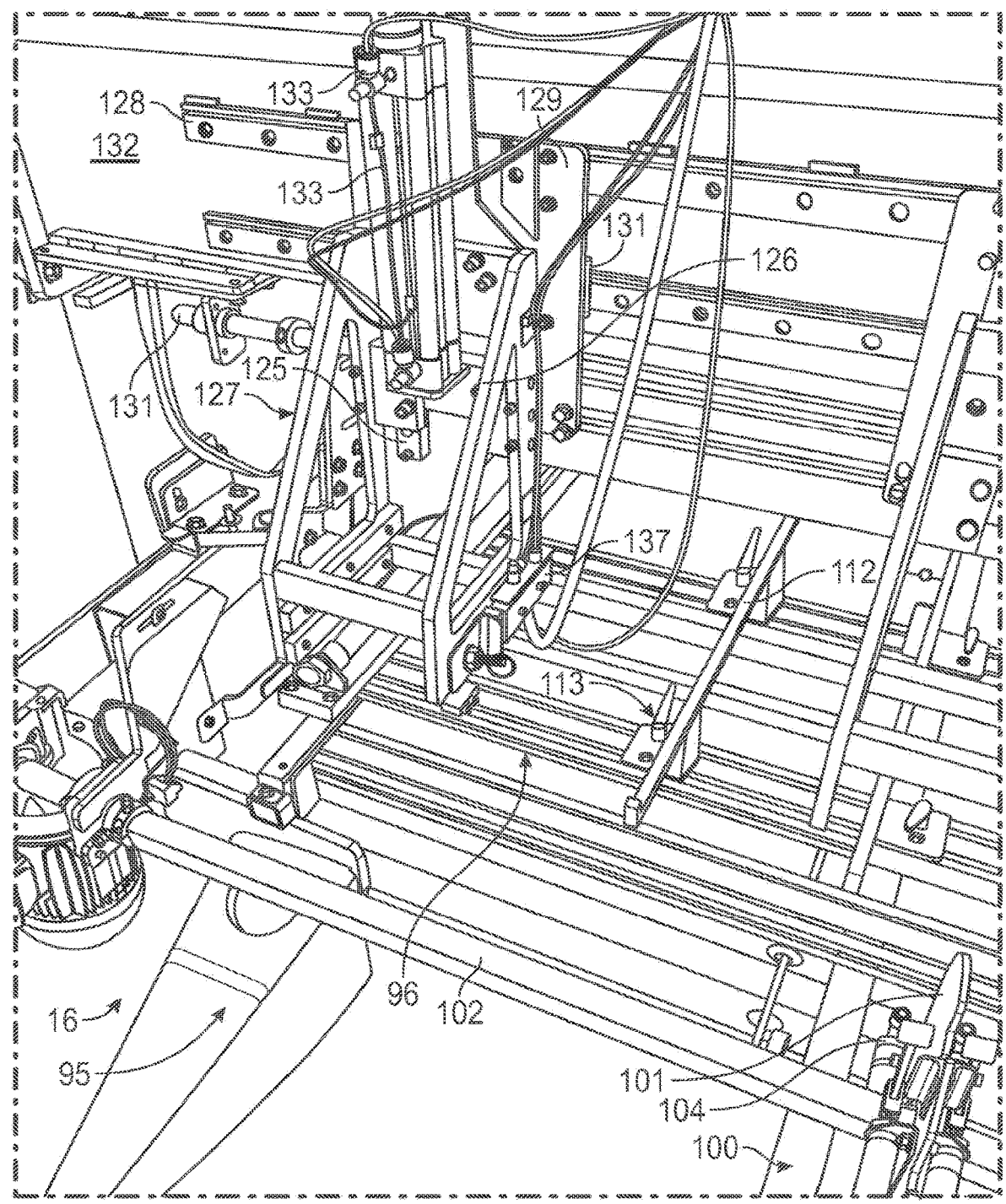
FIG. 4G is a side view of a stapler and sliding bracket of the second truss assembly station.

Filler strip pusher assemblies 74 (FIG. 3A) also generally will be located along the lower or bottom ends of the end or peripheral hopper section 71, as indicated in FIGS. 4F and 4G. Each of the filler strip pusher assemblies includes a pusher plate 76 moveable across the lower or open end of its associated filler strip hopper section, generally being moved or driven by an actuator 78 such as a cylinder, or other actuator, and with the pusher assemblies for each of the filler rail hopper end sections being operated in a staggered, cooperative operation. Thus, a first end of the filler rail or strip will be urged out of its hopper section, followed by the opposite end of the filler rail or strip being urged out of its hopper section, with the filler strips generally being deposited upon support rails 77. The filler strips further generally will be moved along their support rails and into registration on top of the upper surfaces of the top rails.

After application of the filler strip or rail to the upper surface of the top rail, the assembled components are presented to the series of staplers 85 or other fastening devices, as generally indicated in FIGS. 1B-3B, for application of staples, nails or other fasteners to secure the components together and form the first or top truss portion 11. As indicated in FIGS. 2, 3A and 4C, the staplers can include conventional stapler heads with magazines or supplies replaceably engaged therewith, and generally will be releasably mounted within sliding support brackets 80.

The support brackets generally can be mounted on rails 81 (FIGS. 4C-4D) attached to a frame beam or plenum 82 so as to be moveable laterally across the bed of the assembly conveyor. Each of the brackets 80 generally can include a body 83 having a lower or base portion 84 in which the staplers can be slidably received, and locked in place with a releasable locking pin or similar mechanism 86. The staplers further can be pneumatically actuated and can be moved downwardly into engagement with the truss components by operation of a cylinder 87 or similar actuator mounted to the brackets into a sliding support plate 88 by which the brackets are supported on the laterally extending rails 81.

The frame beam or plenum 82 (FIGS. 4C and 4D), in addition to supporting the staplers, also can function as an air tank or supply for the staplers and their cylinders 87. Typically, the beam can store a supply of air therein, with external air also being provided via a conduit or valve assembly 89 connected to one or both ends thereof, so as to thus provide a substantially continuous supply of air for actuation of the staplers and cylinders to avoid disruptions in air supply.

In addition, as indicated in FIGS. 1B and 3A, a primary drive cylinder 90 or other actuator can be mounted at one end of the beam or plenum 82, and will be coupled to the brackets 80 that support the staplers 31 by a drive rod 91. The primary drive actuator can thus control the lateral sliding movement of the staplers with respect to the truss portions therebelow so as to apply staples or other fasteners at multiple locations through the filler strip and top rail and into the blocks.

In addition, the endmost stapler brackets 80A and 80B (FIGS. 3A and 4B) further can include secondary drive cylinders 92 mounted thereto, as indicated in FIG. 4C. The secondary drive cylinders can be coupled to the drive rod or a support therefor, and can be selectively actuated to cause additional movement of the endmost staplers as needed to apply additional fasteners or staplers to the top and filler rails along the outer and end-most blocks.

As indicated in FIGS. 1A-3A, after the first or top truss section or portion 11 has been completed, it will be discharged from the first truss rail assembly station 15 by the further forward movement of the assembly conveyor. The completed first truss portion thereafter can move along the gravity conveyors and be fed directly into the second truss rail assembly station, or, depending on production rates, a series of first truss portions can be queued or otherwise arranged for feeding into the second truss rail assembly station.

The second truss rail assembly station (FIGS. 1A, 2, 3B, 3C, and 4E-4G) generally includes a frame 21 having an upstream or input end 95 and on which is supported a moveable carriage or table 96. The carriage 96 is moveable longitudinally, such as under control of a motor or drive cylinder 97, and further is moveable vertically for receiving and releasing a bottom rail upon stapling or fastening of the bottom rails to the lower ends of the truss blocks, as indicated in FIGS. 1A-2 and 3B.

A rotating clamp assembly 100 (FIGS. 3B and 4E-4G) generally will be provided at the upstream or input end 95 of the second truss assembly station 16 for receiving, reorienting and holding the first truss portion as a bottom rail is applied thereto. The clamp assembly 100 can include a pair of receiving plates 101 mounted along a rotating spindle or rod 102 and each having a series of spaced openings or recesses 103 configured to receive a top and/or filler rail therein. Clamps 104 are mounted to each of the receiving plates, arranged adjacent the recesses 103 thereof. The clamps are generally connected to actuators 105, such as air cylinders or solenoids, or other actuators, and engage and clamp the top end or filler rail portions of the first or top truss portion within the recesses of the receiving plates so as to hold the top truss portion therein as the top truss portion is rotated approximately 180° so as to present the bottom surfaces of the blocks in an upward facing attitude, as indicated in FIG. 1. In addition, the spindle or rotating support rod for the receiving plates can be connected to an air line and thus can act as a source of supply of air for the cylinders 105 actuating the clamps 104.

As indicated in FIG. 4F, a cam assembly 106, including a cam track 107 that rotates with the spindle 102 can be provided at one end of the spindle. As the cam track is rotated, cam followers attached to switch blocks 108 signal actuation/de-actuation of the clamps of the receiving plates, causing the clamps to be actuated as the spindle begins to rotate so that the first truss portion is fixed and held therewith as the first truss portion is reoriented approximately 180° so that its blocks are facing upwardly.

Figure 3B:
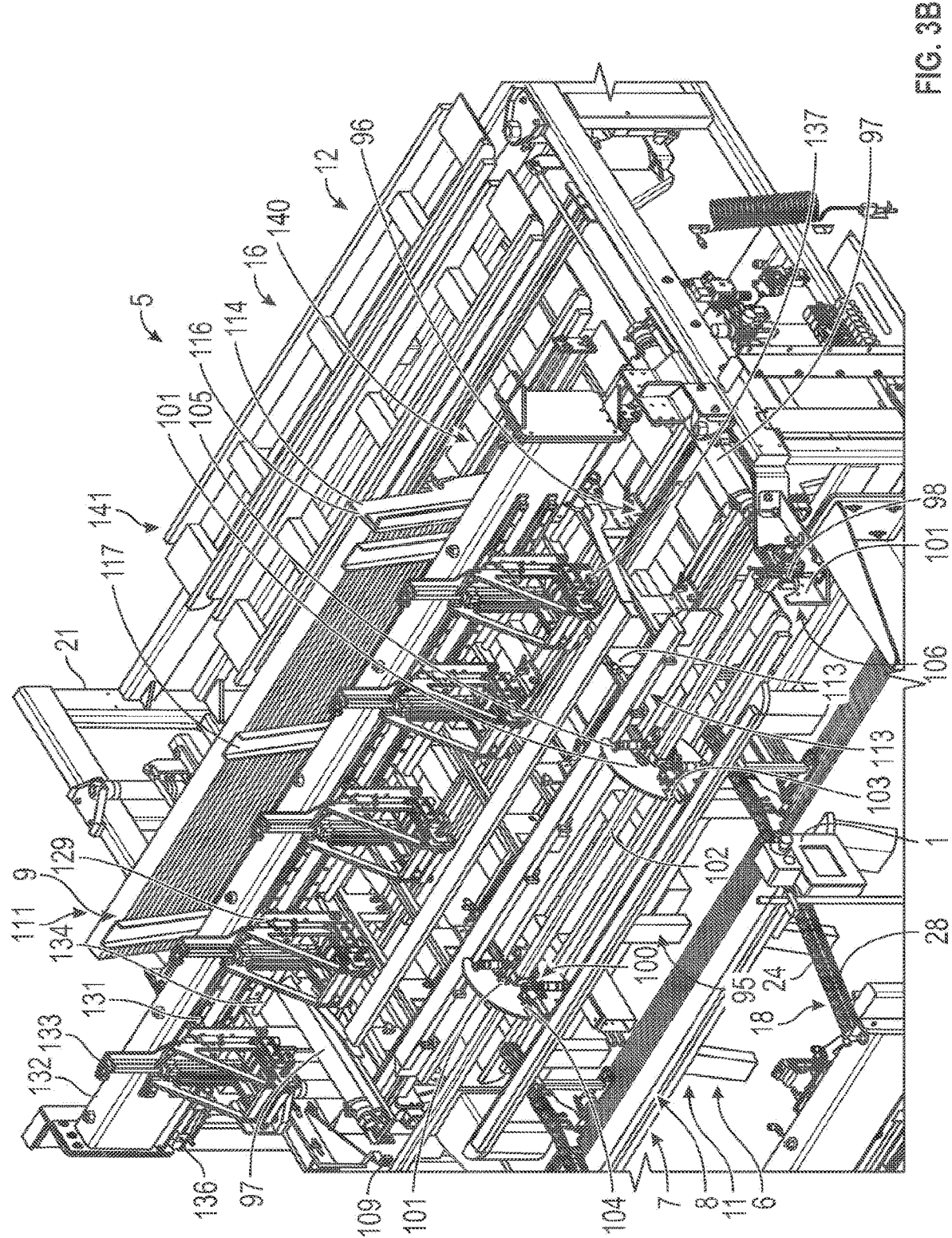

At the opposite end of the spindle, as indicated in FIGS. 3B and 4E, a detector, such as a proximity switch 109, or other, similar detector or sensor, detects the position of the spindle, and thus the first truss portion held thereby as the spindle is rotated to a different 90° positions. The position of the first truss portion is communicated to a control system 1 which monitors and controls the operation of the automatic system 5. In response, the control system can send a signal to release a bottom rail 9 from a bottom rail hopper 111 and onto rails or forks 112 of a bottom rail inserter 113 that is carried by the carriage or table 96, as indicated in FIG. 2B.

As generally indicated in FIGS. 2 and 3B, the bottom rail hopper 111 generally can have a similar construction to the top and/or filler rail or strip hoppers, including at least one peripheral or end hopper section 114 having a C- or U-shaped cavity 116 in which an end of the bottom rail is received. Angled supports 117 also can be provided along the span of the bottom rail, between the end sections of the bottom rail hopper to further support the bottom rails as the stack of bottom rails is progressively fed from the bottom rail hopper.

As indicated in FIG. 3B, bottom rail pusher assemblies 118, including pusher plates 119 driven by actuators 121 can be provided adjacent the lower or discharge ends of the end sections of the bottom rail hopper. The pusher plates of the bottom rail pusher assemblies can be actuated in a staggered, cooperative operation, with one end of the bottom rail being urged out of its end hopper, followed by the opposite end of the bottom rail being urged out of its end hopper section.

The bottom rails will be received on the bottom rail inserter, which is moved or incremented forwardly with the movement of the carriage 96 so as to position the bottom rail into registration with the upwardly facing bottom surfaces of the blocks of the first truss portion. As indicated in FIGS. 1A, 2 and 3B, the bottom rails will generally be aligned with the blocks at a position below a series of staplers 125 or similar fastening mechanisms that will apply a series of staples into the bottom rail and blocks.

Each of the staplers 125 generally will be a conventional stapler or fastening gun, with a magazine or replaceable supply of staples, and can be slidably received within a base portion 126 of a support bracket 127. As further indicated in FIGS. 3B and 4G, the brackets will be slidably mounted on vertical rails 128 attached to sliding plates 129 that are further slideably supported by horizontally extending rails 131 attached to a beam or plenum 132. The beam or plenum 132 can be connected to an air supply and act as a substantially continuous source or supply of air for the staplers 125, and for cylinders 133 that control the vertical movement of the staplers into engagement with the bottom rails for application of the staples or fasteners thereto.

The slide plates 129 further generally are connected or coupled to a drive rod 134 that is connected at one end to a primary drive cylinder 136 or other, similar actuator, which is operable to selectively move the staplers laterally with respect to the bottom rail for application of the staples at multiple positions or locations therealong. In addition, secondary drive cylinders 137 can be mounted along the brackets 127 for the staplers 125 and will be operable to cause longitudinal movement of the staplers as needed for application of staples or other fasteners at additional locations along the bottom rails and blocks. For example, a series of four staples can be placed through the bottom rail and into each of the blocks by shifting the staplers laterally and longitudinally, for example, in a substantially square pattern or in a diagonal movement.

Once the bottom rail has been secured to the bottom surfaces of the blocks, the carriage can be lowered to move the inserter out of a position supporting the bottom rail, and thereafter retracted back to a position for receiving a next bottom rail from the bottom rail hopper. The clamp assembly is thereafter rotated approximately 90° and the clamps thereof are released from engagement with the top and/or filler rails of the now completed truss. The truss can be deposited/received on and carried away from the clamping assembly by a completed truss rail assembly conveyor 140 as the clamp assembly is further rotated to receive an next first truss portion. The completed trusses can be fed by the completed truss rail assembly conveyor to a discharge position 141 for discharge from the second truss rail assembly station and onto a stacker, lift or cart 142. Alternatively, the completed trusses can be further transferred to a next station for use in forming the foundation frames, or can be sent to an inventory as needed.

Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present disclosure as set forth in the appended claims.

What is claimed is:

1. A system for formation of foundation trusses for box springs or mattress foundation frames, comprising:
    a first truss rail assembly station including:
        block feeders located adjacent an upstream end of an assembly conveyor, each block feeder comprising a hopper in which a series of blocks are received, a block pusher for urging the blocks along the hopper and toward a discharge end of the hopper, and a loader positioned adjacent the discharge end of the hopper and configured to move the blocks through the discharge end of the block feeder and onto the assembly conveyor;
        a first rail hopper positioned downstream from the block feeders, the first rail hopper configured to feed at least one rail onto an associated set of blocks as the associated set of blocks is moved along a path of travel by the assembly conveyor; and
        a series of fastening devices moveable into engagement with each rail received on its associated set of blocks and apply fasteners for coupling each rail to its associated set of blocks to form a first truss portion; and
    a second truss rail assembly station, comprising:
        a second rail hopper in which a supply of additional rails is received and dispensed;
        a carriage on which additional rails dispensed from the second rail hopper are received, the carriage moveable to position each additional rail into registration with the blocks of an associated first truss portion received in the second truss rail assembly station; and
        a series of fastening mechanisms configured to apply fasteners for attaching each additional rail to the blocks of its associated first truss portion to form a foundation truss.

2. The system of claim 1, further comprising a transfer mechanism positioned between the first truss rail assembly station and the second truss rail assembly station and configured to receive and transfer each first truss portion from the first truss rail assembly station to the second trust rail assembly station.

3. The system of claim 1, wherein the first truss rail assembly station further comprises a filler strip hopper arranged downstream from the first rail hopper and configured to dispense filler strips onto each first rail and associate set of blocks moving along their path of travel.

4. The system of claim 1, wherein the first rail hopper further comprises a pair of pusher assemblies configured to engage and urge opposite ends of each first rail out of the first rail hopper for placement of each first rail onto its associated set of blocks moving along the assembly conveyor.

5. The system of claim 1, wherein the discharge of each block feeder comprises a chute having a plurality of biased tabs therealong, the tabs adapted to engage and at least partially hold each block within the chute until the block is dislodged by the loader.

6. The system of claim 5, wherein the loader of each block feeder comprises at least one loading plate connected to an actuator, the actuator configured to move the loading plate into engagement with the block held within the chute.

7. The system of claim 1, wherein at least one of the block feeders further comprises an adhesive applicator connected to a loading plate of the loader of the at least one of the block feeders for applying an adhesive to one or more blocks prior to placement of the rail thereon.

8. The system of claim 1, wherein fastening devices of the first truss rail assembly station are slidably mounted along a frame, and further comprising a drive actuator coupled to the frame and configured to control movement of the fastening devices across the assembly conveyor for substantially aligning the fastening devices with the sets of blocks moving along the path of travel.

9. The system of claim 1, wherein the second truss rail assembly station further comprises a rotating clamp assembly including a series of receiving plates, each having recesses configured to receive at least a portion of each first truss rail portion therein, and clamps adjacent the recesses of each receiving plate; wherein the clamps are selectively actuatable to hold the portion of each first truss rail portion within the recesses of each receiving plate for rotation of each first truss rail portion to a position for application of the additional rail thereto.

10. The system of claim 9, further comprising at least one detector for detecting and communicating a position of the series of receiving plates during rotation thereof for controlling engagement and disengagement of the clamps.

11. The system of claim 1, wherein the carriage of the second truss rail assembly station further comprises rail inserters on which the additional rails are received and supported as the additional rails are fastened to the first truss portions, the rail inserters being further moveable vertically out of engagement with the second rails after fastening.

12. A method of forming foundation trusses for box springs or foundation sets, comprising:
moving a set of blocks along an assembly conveyor;
feeding a top rail into registration with the set of blocks moving along the assembly conveyor;
attaching the top rail to the set of blocks for forming a first truss portion;
engaging and rotating the first truss portion to reorient the set blocks of the first truss portion;
moving a bottom rail from a hopper and into registration with the set of blocks, and attaching the bottom rail to the set of blocks to form a foundation truss; and
releasing the foundation truss toward a discharge.

13. The method of claim 12, further comprising loading a series of blocks into a plurality of block feeders, urging the blocks within each of the block feeders toward a discharge end of each of the block feeders, and moving the blocks through the discharge end of each block feeder and onto the assembly conveyor to form the set of blocks on the assembly conveyor.

14. The method of claim 13, wherein moving the blocks through the discharge of each block feeder further comprises at least initially engaging and holding a next block to be loaded within the discharge of each block feeder, and selectively operating a series of actuators to engage and move the next block downwardly past protrusions and onto the assembly conveyor.

15. The method of claim 12, further comprising applying an adhesive material to an upper surface of one or more blocks of the set of blocks on the assembly conveyor.

16. The method of claim 12, further comprising feeding a filler rail into a position overlying the top rail.

17. The method of claim 16, wherein attaching the top rail to the set of blocks for forming a first truss portion comprises moving a series of staplers into engagement with the filler rail overlying the top rail, and inserting fasteners through the filler rail and top rail and into each block.

18. The method of claim 12, wherein engaging and rotating each first truss portion to reorient the set of blocks comprises receiving the top rail of a first truss portion within recesses of spaced clamp plates, applying clamps to the top rail of the first truss portion; and rotating the clamp plates so as to position bottom surfaces of the set of blocks of the first truss portion to an upwardly facing attitude.

19. The method of claim 18, wherein applying clamps to the top rail of the first truss portion further comprises monitoring and communicating a position of the clamp plates during rotation thereof and engaging and disengaging the clamps based upon the position of the clamp plates.

20. The method of claim 12, wherein moving a bottom rail from a hopper and into registration with the set of blocks comprises feeding the bottom rail onto a carriage, moving the carriage sufficient to position the bottom rail over the set of blocks for application of fasteners thereto for attaching the bottom rail to the set of blocks; and, after the fasteners have been applied, lowering the carriage and returning the carriage to an initial position to receive a next bottom rail.

* * * * *